US007939770B2

(12) United States Patent
Izumo et al.

(10) Patent No.: US 7,939,770 B2
(45) Date of Patent: May 10, 2011

(54) LOAD MEASURING MECHANISM FOR AN ELECTRONIC BALANCE HAVING A DOUBLE LEVER STRUCTURE PROVIDED WITH A FIRST LEVER MEMBER AND A SECOND LEVER MEMBER CONNECTED TO THE FIRST LEVER MEMBER

(75) Inventors: Naoto Izumo, Saitama (JP); Satoshi Suzaki, Saitama (JP)

(73) Assignee: A & D Company, Limited, Toshima-ku, Tokyo (JP)

( * ) Notice: Subject to any disclaimer, the term of this patent is extended or adjusted under 35 U.S.C. 154(b) by 281 days.

(21) Appl. No.: 12/298,197

(22) PCT Filed: Apr. 27, 2007

(86) PCT No.: PCT/JP2007/059538
§ 371 (c)(1),
(2), (4) Date: Oct. 23, 2008

(87) PCT Pub. No.: WO2007/129718
PCT Pub. Date: Nov. 15, 2007

(65) Prior Publication Data
US 2009/0242280 A1    Oct. 1, 2009

(30) Foreign Application Priority Data
May 2, 2006    (JP) ................. 2006-128225

(51) Int. Cl.
*G01G 21/16*    (2006.01)
*G01G 21/24*    (2006.01)
*G01G 23/02*    (2006.01)
(52) U.S. Cl. .................. 177/212; 177/201 EM; 29/593

(58) Field of Classification Search .......... 177/210 EM, 177/212; 29/593
See application file for complete search history.

(56) References Cited

U.S. PATENT DOCUMENTS
4,799,561 A * 1/1989 Komoto .................. 177/229
(Continued)

FOREIGN PATENT DOCUMENTS
DE    41 19 734    12/1992
(Continued)

OTHER PUBLICATIONS
International Preliminary Examination Report (Application No. PCT/JP2007/059538) dated Dec. 24, 2008.
(Continued)

*Primary Examiner* — Randy W Gibson
(74) *Attorney, Agent, or Firm* — Eric J. Robinson; Robinson Intellectual Property Law Office, P.C.

(57) ABSTRACT

An integral type second lever constituting member (A) is mounted on a constitution, in which a first lever member (5) is assembled in a Roberval's mechanism composed of a stationary block (1), a floating frame (2) and upper and lower sub-levers (3, 4). The integral type second lever constituting member (A) is mounted by mounting a force point portion (9) and a fulcrum portion (8) on the Roberval's mechanism through screw-fastened holes (8a, 9a), thereby to assemble a load measuring mechanism as a whole. At the screw-fastening time, the turning torque of the screw is supported by a connecting portion (10), and this connecting portion (10) is removed after the integral type second lever constituting member (A) was mounted. In the load measuring mechanism of an electronic balance, the second lever member can be mounted easily and reliably.

7 Claims, 5 Drawing Sheets

U.S. PATENT DOCUMENTS

| | | | |
|---|---|---|---|
| 5,090,494 A * | 2/1992 | Muller et al. | 177/229 |
| 5,340,951 A | 8/1994 | Hungerbuhler et al. | |
| 6,472,618 B1 | 10/2002 | Izumo et al. | |
| 6,693,245 B2 * | 2/2004 | Watabiki et al. | 177/210 EM |
| 7,307,226 B2 * | 12/2007 | Iiduka | 177/210 EM |

FOREIGN PATENT DOCUMENTS

| | | |
|---|---|---|
| DE | 100 15 311 | 10/2000 |
| EP | 0 518 202 | 12/1992 |
| JP | 05-196492 | 8/1993 |
| JP | 2000-283829 | 10/2000 |
| JP | 2001-066178 | 3/2001 |
| JP | 2003-004011 | 1/2003 |
| JP | 2007-298463 A * | 11/2007 |

OTHER PUBLICATIONS

International Search Report for PCT/JP2007/059538, Aug. 14, 2007.

* cited by examiner (A)

(B)

(C)

(D)

LOAD MEASURING MECHANISM FOR AN ELECTRONIC BALANCE HAVING A DOUBLE LEVER STRUCTURE PROVIDED WITH A FIRST LEVER MEMBER AND A SECOND LEVER MEMBER CONNECTED TO THE FIRST LEVER MEMBER

TECHNICAL FIELD

The present invention relates to an electromagnetic balancing-type balance (hereinafter referred to as "electronic balance"), and particularly relates to a load measuring mechanism for an electronic balance and a method for assembling the load measuring mechanism.

BACKGROUND ART

A magnetic field consisting of a permanent magnet is formed at the electromagnetic force generating portion of an electronic balance, and a winding (force coil) is arranged with respect to the space portion formed in the magnetic field so as to intersect the magnetic field. The load of a weighed object is transmitted to the electromagnetic force generating portion through a lever mechanism and attempts to displace the force coil of the lever mechanism formed integrally and arranged in the electromagnetic portion. The configuration is such that with respect thereto the displacement of the force coil is brought into equilibrium by Lorentz force generated by passing currents through the force coil, and the load of the weighed object is calculated from the amount of electricity used at that time.

FIG. 7 of the present application schematically shows the load measuring mechanism in the above-described electronic balance. In this mechanism, a Roberval's mechanism is constituted by upper and lower sub-levers 50, 51, a displacement member (hereinafter referred to as "floating frame") 52 which is displaced by the load of a weighed object imposed on a weighing pan 56, and a stationary block 58 fixed to the main body of the weighing apparatus; a lever member 54 is constituted with respect to this Roberval's mechanism through a suspending band 53 which is a connecting member, so as to be rockable by means of a fulcrum 55.

In the above-described constitution, the load W of a weighed object imposed on the weighing pan 56 is guided by this Roberval's mechanism to be transmitted to the lever member 54, and the lever member 54 attempts to be displaced in the X direction by the load W. With respect thereto, electric power is supplied to a force coil 60 arranged close to a permanent magnet 57 in the electromagnetic portion so as to generate Lorentz force for bringing the lever member 54 into equilibrium, and the amount of this electric power is converted to the load of the weighed object thereby to measure the load W of the weighed object.

Here, the constitution of FIG. 7 only schematically shows the principle of the load measuring mechanism portion of an electronic balance; in a real machine, the load measuring mechanism portion has a considerably complex structure, having a double lever structure in order to have a greater lever ratio, or having various electronic circuits provided in combination, for example.

On the other hand, need for reduction in the size of the whole weighing apparatus is expected to be further more severe in the future. As a solution to that, a load measuring mechanism is becoming necessary which has a lever mechanism of a high lever ratio so as to measure a relatively large load by an electromagnetic portion of small capacity. In this case, since the setting of the lever ratio by one lever member is limited, a method of greatly increasing the lever ratio by connecting a plurality of lever members is adopted.

A method of assembling those constituted as separate parts by spring materials, aluminum materials or the like is usually adopted for the load measuring mechanism shown in FIG. 7. However, reduction in the size of the mechanism by such an assembly method is limited. Moreover, it requires labor and time, and further a high degree of experience; for example, instrumental error is generated depending on the degree of screwing or the like at the time of assembly, or fine adjustment is performed after assembly.

From the above-described viewpoint, a constitution is proposed in which the load measuring mechanism is integrally formed in advance so that the assembly process of this mechanism can be substantially omitted. In this constitution, for example, a metal block of aluminum or the like is worked to form the Roberval portion, lever portion and the like being connected; portions necessary for a load measuring mechanism are formed from one metal block.

While the above-described problems in the assembly process can be avoided by the constitution as described above, other problems as follows arise.

To constitute an integral type mechanism from a metal block, highly accurate and complex working processing such as wire cutting and subtle cutting working needs to be performed. Consequently, cost for working the parts greatly increases as compared with the case of the conventional assembling type in which separate parts are manufactured. Further, if working of part of the worked portions in the metal block is inappropriate, since it is an integral type, the whole block is unusable; thus the yield of the product is poor, which is also an important cause of increase in the price. In the same way, if a malfunction occurs in the load measuring mechanism at the stage of using the electronic balance, since replacement of parts is impossible, the whole of the integral type load measuring mechanism has to be replaced so that repair cost is inevitably high.

From the above-described viewpoints, a completely integral type load measuring mechanism as described above has many problems with respect to yields of products, maintenance and the like at the stage of being constituted as a real machine.

In consideration of this point, conventionally some proposals have been made to achieve both easy assembly of the mechanism and reduction of manufacturing cost of the product by integrating only part of the load measuring mechanism.

In a device shown in Japanese Utility Model Application Laid-Open No. S64-5127 which is a prior art document, thin plates in which a fulcrum, a lever portion and the like are formed by machining working in advance are screw-fastened through spacers, thereby to constitute as a whole a load measuring mechanism having the Roberval's mechanism and the lever mechanism. By thus making a constitution from a plurality of parts, any of the parts being defective can be replaced so that the yields of the product are expected to be considerably improved as compared with the completely integral type constitution.

In the device of the above-described prior art document, two thin plates of the same shape having a fulcrum or a lever portion formed by cutting are screw-fastened to both sides of spacers to constitute as a whole a Roberval's mechanism and a lever mechanism. Therefore, even a slight error in the state of attachment of the two thin plates can generate distortion in the whole of the Roberval's mechanism and lever mechanism to cause trouble in load measuring. Therefore, the assembly requires precise care. In addition, this device has a constitution in which the Roberval's mechanism receiving the real load in the vertical direction is fixed by fastening screws arranged in the horizontal direction; therefore there is a possibility that the position of attachment of the members is changed by the load and stable performance as a measuring apparatus cannot be provided.

In the invention described in Japanese Patent Application Laid-Open No. 2002-148105, the Roberval's mechanism and part of the lever mechanism are constituted integrally from a metal block, and a long beam is connected to the lever portion of the metal block to set a high lever ratio; it is a completely integral type except for the beam portion and has problems common to the above-described completely integral type constitution. In the same way, Japanese Patent No. 2570405 has the major portion of an integral type and also has problems common to the completely integral type constitution.

The invention described in Japanese Patent Application Laid-Open No. 2001-066178 has an asymmetric constitution in which a second lever in a double lever constitution is arranged at one side of the Roberval's mechanism; it is not necessary to perform fine adjustment so as to completely match the attachment of two members as in a lever portion consisting of two thin plates of the same shape; however, there is a problem that since the second lever is positioned projecting at a side portion of the Roberval's mechanism portion in the constitution, need for reduction in the size of the mechanism as well as reduction of assembly error and cost reduction by means of reduction of the number of components cannot be sufficiently met.

In addition, Japanese Patent Application Laid-Open No. 2000-283829, the object of which is to overcome the poor yields of the completely integral type mechanism and provide a compact and high performance load transmitting mechanism equivalent to the completely integral type mechanism, describes a structure in an electromagnetic balancing-type balance having a Roberval's mechanism and a load transmitting beam for transmitting an imposed load to an electromagnetic portion by being guided by the Roberval's mechanism, comprising: an integral type Roberval's mechanism portion in which a portion operating as a Roberval is formed by a space portion being formed between a load receiving portion and a stationary portion; a load transmitting beam; and a member to be the fulcrum and a member to be the force point of the load transmitting beam, wherein attachment portions of the members constituting the fulcrum and force point are formed in the space portion such that the fulcrum and force point of the load transmitting beam are positioned in the space portion. However, it has a problem that it cannot sufficiently satisfy needs such as easy assembly of the mechanism and minimization of fine adjustment after assembly.

Other related prior art documents include Japanese Patent Application Laid-Open No. 2002-148105, U.S. Pat. Nos. 4,799,561, 5,962,818, 6,472,618 B1, 6,787,714 B2, 6,861, 593 B2, European Application No. EP1189043 A1, Germany Patent No. DE19804439 C1, Germany Patent No. DE1034272 B3, and Germany Patent No. DE10332400 B3, but none of the inventions described in these documents solves all of the technical problems described above.

DISCLOSURE OF THE INVENTION

It is the objective of the present invention to provide an electronic balance having an electromagnetic balancing-type load measuring mechanism, assembly of which mechanism is easy and therefore fine adjustment after assembly of which mechanism is unnecessary or minimized, and which provides high performance and is small in size.

To achieve the above-described objective, the present invention has the following constitution.

It relates to a load transmitting mechanism of an electronic balance which is a load measuring mechanism having a double lever structure having a first lever member and a second lever member connected to the first lever member, and which is characterized by being constituted such that the second lever member has a fulcrum portion, a force point portion connected to the first lever member and at least part of a lever portion formed on the same plane, the first lever member is arranged in a Roberval's mechanism (formed by a stationary block, a floating frame and an upper sub-lever and a lower sub-lever) or in a Roberval, and at the same time the second lever member is attached to one side of the Roberval's mechanism.

In addition, it relates to a method for assembling a load transmitting mechanism of an electronic balance, characterized in that at least one of the fulcrum portion and the force point portion of the second lever member is formed such that both ends thereof are connected to the main body of the lever member by the main body of the second lever member and a connecting portion, and the connecting portion is removed after the second lever member is screw-fastened to the Roberval's mechanism and the first lever member.

The second lever portion is formed of a thin plate in the shape of a flat plate and is attached to one side of the Roberval's mechanism by screw-fastening so that assembly of the load measuring mechanism is easy, reduction of the size is possible, and fine adjustment after assembly as in the case of using two thin plates of the same shape is substantially unnecessary.

The fulcrum portion and the force point portion which are part of the second lever member have both ends thereof connected to the main body of the second lever member through the main body of the second lever member and the connecting portion. Therefore, this connecting portion increases the rigidity of the lever portion at the time of attaching the second lever member to the Roberval's mechanism side with screws and breaks the torque of screw-fastening at the time of assembly. In addition, by removing the connecting portion after completion of screw-fastening, even a person without special skill can assemble the load measuring mechanism properly and safely; production of a high performance load measuring mechanism with high yields is enabled.

BEST MODES FOR CARRYING OUT THE INVENTION

The fulcrum portion, force point portion and part of lever portion of the second lever member are formed from a thin plate so as to be on the same plane, and a force coil positioned at the electromagnetic portion is arranged as the load point portion at the end opposite to the fulcrum portion through the force point portion; the end where the force coil is set of the lever portion of the second lever member provided on one side of the Roberval's mechanism is flexurally formed such that the force coil is positioned at the electromagnetic portion.

Embodiment 1

Of the load measuring mechanism of the present invention, the load transmitting mechanism for transmitting the load of a weighed object to the electromagnetic portion generally consists of a Roberval's mechanism containing a first lever member or having the first lever member arranged on one side, and an integral type second lever member (hereinafter referred to as "integral type second lever constituting member") constituting a second lever portion attached to one side of the Roberval's mechanism.

Figure 1:
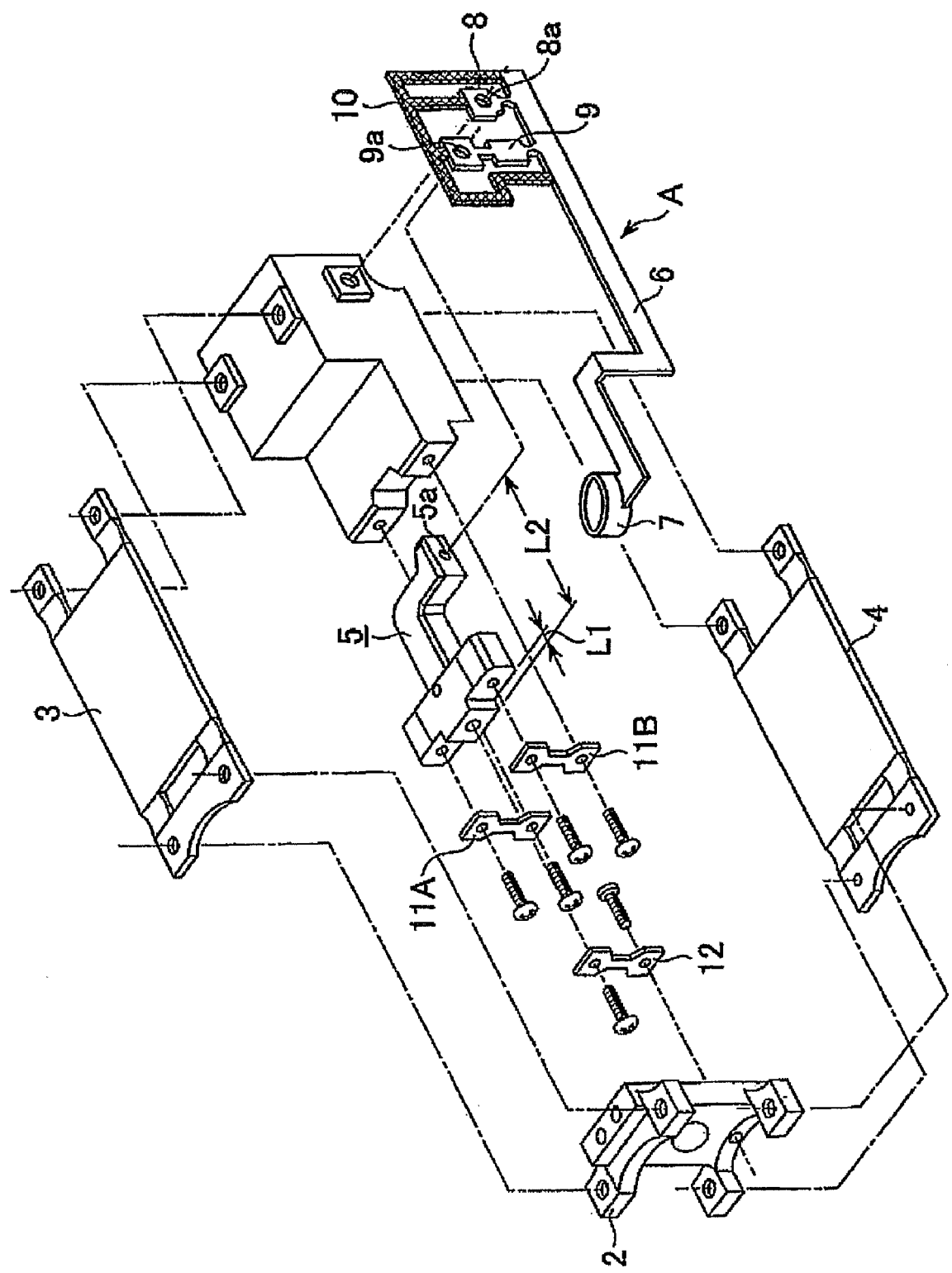
FIG. 1 is an exploded perspective view of a load measuring mechanism of an electronic balance of the present invention.

FIG. 1 is an exploded view showing the constitution of the load transmitting mechanism of the above-described load measuring mechanism, the electromagnetic portion being omitted.

The member denoted by the symbol A in the drawing is the integral type second lever constituting member; all but the integral type second lever constituting member A are members constituting a Roberval's mechanism which contains the first lever member.

Of them, the constitution of the Roberval's mechanism will be described first, and the constitution of the second lever member attached to the Roberval's mechanism will be described next.

Reference numeral 1 denotes a stationary block, reference numeral 2 denotes a floating frame for receiving the load of a weighed object, reference numeral 3 denotes an upper sub-lever, and reference numeral 4 denotes a lower sub-lever; a Roberval's mechanism is constituted by screw-fastening these four members.

Reference numeral 5 denotes a first lever member, which is arranged in the Roberval's mechanism in the following constitution.

Reference numerals 11A, 11B denote spring members which form the fulcrum of the first lever member, having upper and lower screw-fastened portions formed; the respective lower screw-fastened portions are screw-fastened to the stationary block 1, the upper screw-fastened portions are screw-fastened to both sides of the end of the first lever member 5, and the first lever member 5 is constituted rockably with these spring members 11A, 11B being the fulcrum.

Reference numeral 12 denotes a spring member constituting a suspending band, the lower screw-fastened portion of which is screw-fastened to the floating frame 2, and the upper screw-fastened portion of which is screw-fastened to a floating frame attachment portion of the first lever member, formed protruding by a width of L1 in the middle of the portions for attachment of the fulcrum spring members 11A, 11B. Thus the first lever member 5 is constituted so as to rock in correspondence with the ascending and descending action of the floating frame, guided by the Roberval's mechanism, with a lever ratio of L1 to L2, wherein L2 is the distance between the fulcrum attachment portion and a later-described screw hole 5a which is the portion for attachment of the force point of the second lever member.

Next the constitution of the second lever member A will be described.

Figure 2:
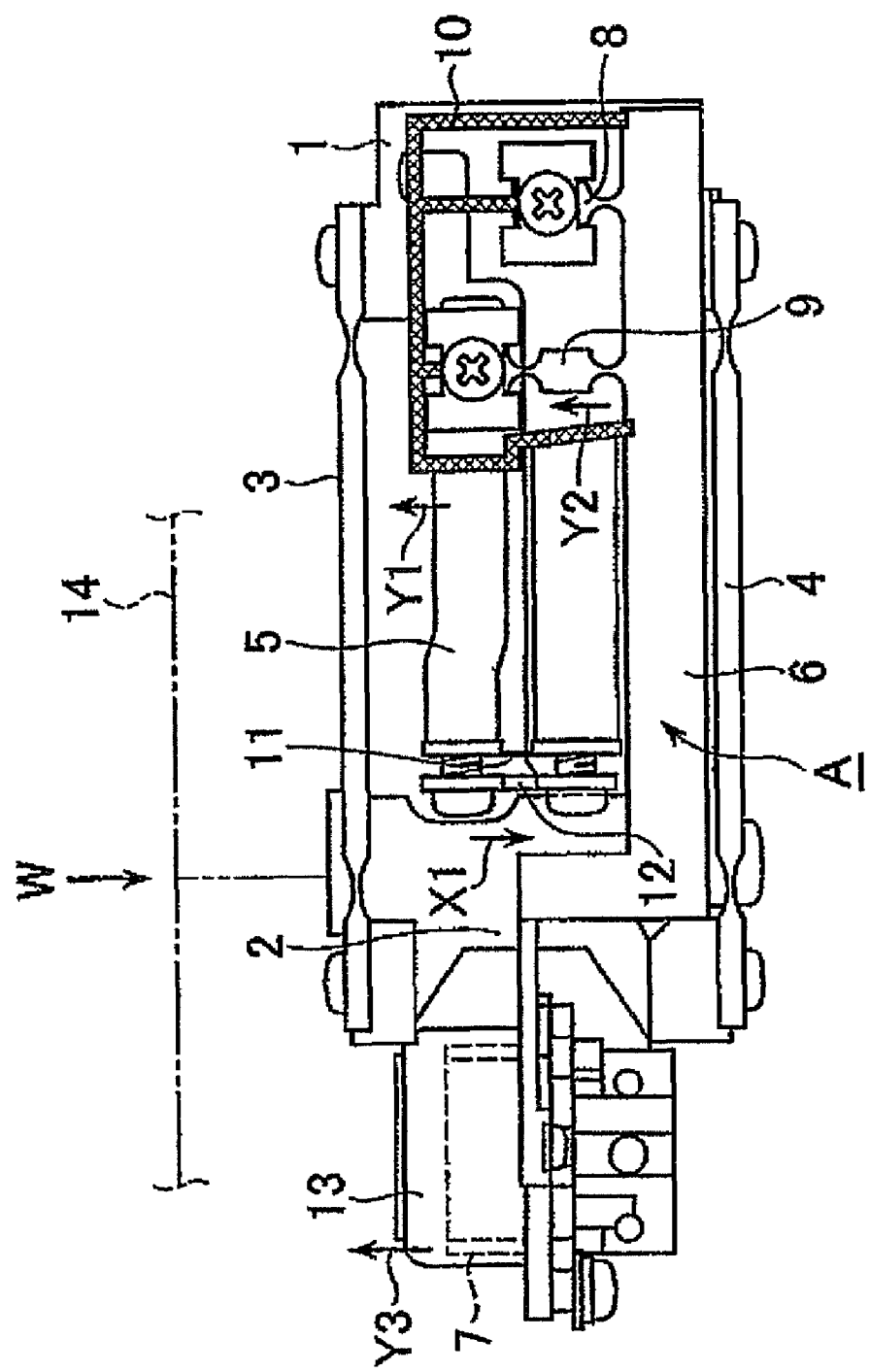
FIG. 2 is a side view showing the state in which assembly of the load measuring mechanism shown in FIG. 1 has been completed.

The integral type second lever constituting member A is formed from a thin plate or formed as a constitution in which a thin plate having the fulcrum portion, force point portion and the like formed is attached to a thin plate which constitutes the lever portion, as in the second embodiment shown in FIG. 2.

Of the integral type second lever constituting member A, the portion denoted by reference numeral 6 is a second lever portion which constitutes a second lever, and the end portion thereof is bent toward the Roberval's mechanism side, and at the end thereof is provided a force coil 7 which constitutes part of the electromagnetic portion.

Meanwhile, a fulcrum portion 8 is formed at the other end of the second lever portion, and a force point portion 9 which is a connecting member to be connected to the first lever member 5 is formed adjacent to the fulcrum portion 8. Reference numerals 8a, 9a denote screw-fastened-holes provided in the fulcrum portion 8 and the force point portion 9. Reference numeral 10 denotes a connecting portion which connects to the ends of the fulcrum portion 8 and the force point portion 9 opposite to the connecting portions which connect to the second lever portion 6 side. The connecting portion 10 is constituted as a frame which supports the fulcrum portion 8 and force point portion 9.

The integral type second lever constituting member A having the above-described constitution is attached to the Roberval's mechanism in the following manner.

That is, a screw inserted through the screw-fastened-hole 8a of the fulcrum portion 8 is screwed to a screw hole 1a of the stationary block 1 of the integrally constituted Roberval's mechanism; in the same way, a screw inserted through the screw-fastened-hole 9a of the force point portion 9 is screwed to a screw hole 5a of the first lever member 5 thereby to fix the force point portion 9 to the first lever member 5.

As apparent from the later-described constitution of the integral type second lever constituting member of FIG. 2 and later, the connecting portions between the fulcrum portion 8 and force point portion 9 and the second lever portion 6 are formed to be extremely thin and have a physically weak structure in order to provide smooth rocking action of the second lever portion 6. Therefore, if screw-fastening of the fulcrum portion 8 and force point portion 9 is attempted without the connecting member 10, the turning torque of the screws is transmitted to the fulcrum portion 8 and force point portion 9 at the time of screwing and the above-described thin portions cannot resist that turning torque so that attachment of the fulcrum portion 8 and force point portion 9 is highly likely to be displaced; fine adjustment after assembly is inevitable even if the displacement by assembly is little; in many cases degradation of performance is caused by distortion in assembly.

In contrast thereto, when the connecting portion 10 is formed, rigidity of the integral type second lever constituting member is sufficiently high, the turning torque of screw-fastening is supported by the connecting portion 10 side to avoid transmission of the turning torque to the above-described thin portions, and the whole integral type second lever constituting member A can be readily attached in a proper state. When attachment of the integral type second lever constituting member A has been completed, the connecting portion 10 is removed. In this case, if the portion to be removed from the main body of the integral type second lever constituting member A is formed in advance in a shape equivalent to being thin, having the rigidity decreased within the extent that the turning torque at the time of screw-fastening can be supported, the connecting portion 10 can readily be removed with a tool such as pincers and pliers.

Although not directly relating to the invention of the present application, of course the force coil 7 is arranged at a predetermined position in the electromagnetic portion when the integral type second lever constituting member A is attached.

FIG. 2 shows a state of assembly of the load measuring mechanism of the above-described constitution. Reference numeral 13 denotes an electromagnetic portion; the force coil 7 provided on one end of the integral type second lever constituting member A is housed and arranged in the electromagnetic 13. Reference numeral 14 denotes a weighing pan; the load W of a weighted object on the weighing pan 14 is transmitted through the weighing pan 14 to displace the floating frame 2. That is, the floating frame 2 attempts to descent in the X1 direction by the load of a weighed object on the weighing pan 14, and this action operates to cause the other end of the first lever member 5 to ascend in the Y1 direction by means of the suspending band 12 and the fulcrum spring members 11a, 11B.

This action of the first lever member 5 is transmitted to the force point portion 9 of the integral type second lever constituting member A connected to the first lever portion 5, operates to cause the force point portion 9 to ascend in the Y2 direction with the fulcrum portion 8 being the fulcrum, and further is transmitted to the force coil 7 as amplified action of ascending in the Y3 direction by the lever portion 6, the lever ratio of which is the distance between the fulcrum portion 8 and the force point portion 9 and the distance between the fulcrum portion 8 and the force coil 7. Electric power is supplied to the force coil 7 so as to cancel and bring into equilibrium this action in the Y3 direction, and the load of the weighed object is calculated from the amount of this electric power supplied. The portion shown in a check pattern in the drawing is the connecting portion 10 to be removed after assembly of the mechanism.

Embodiment 2

Figure 3:
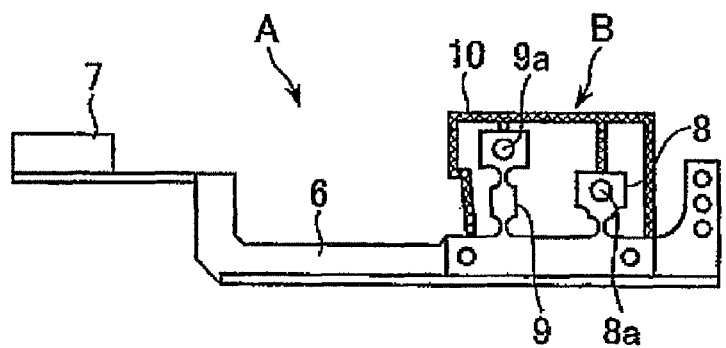
FIG. 3 shows the constitution of an integral type second lever constituting member which shows a second embodiment, wherein (A) is a side view of the same lever member, (B) is a plan view, (C) is a side view and (D) is a side view showing the state of removal of the connecting portion.
Figure 3:
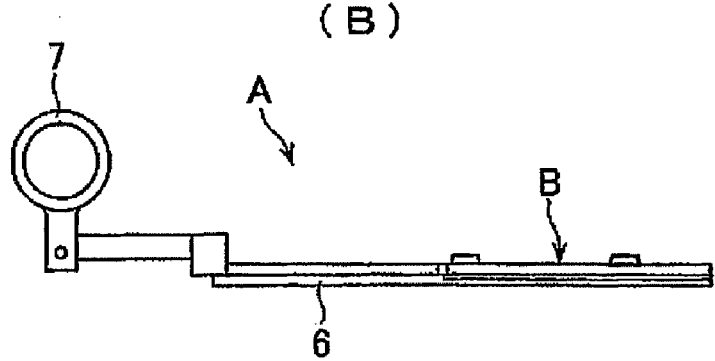
Figure 3:
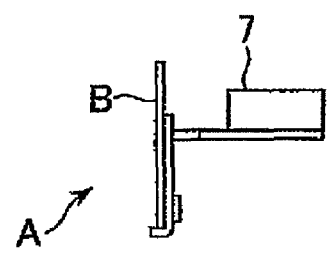
Figure 3:
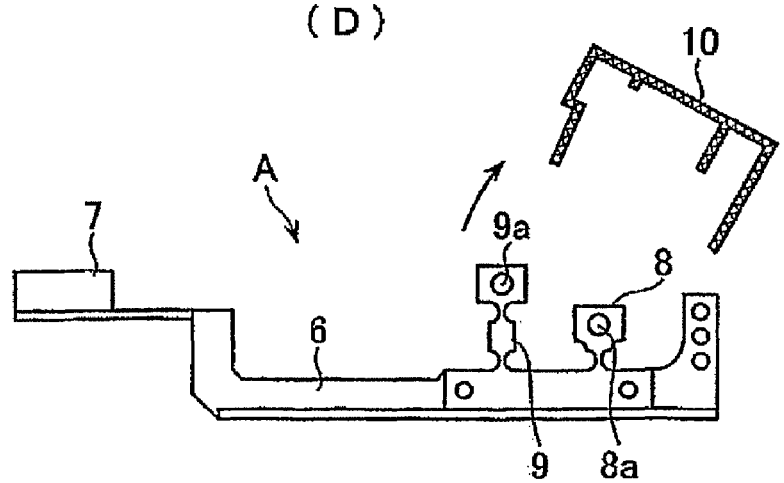

FIG. 3 shows a second embodiment of the present invention.

While the integral type second lever constituting member A shown in FIG. 1 is constituted as a whole by one member, in the present embodiment, the constitution is such that a portion constituting the fulcrum portion and force point portion is formed from a thin plate of another material with respect to the main body of the integral type second lever constituting member A mainly consisting of the lever portion 6, and this thin plate is fixedly provided on the main body A.

In an electronic balance, the load of a weighed object needs to be reliably transmitted to the electromagnetic portion; therefore, the whole integral type second lever constituting member A is required to have relatively high rigidity; on the contrary, the fulcrum portion and force point portion require a highly flexible material providing easy deformation and restitution after deformation such as a spring material in order to provide sensitive action of the lever. Therefore in the present embodiment, this deforming portion forming member B is constituted by a spring material, and the constitution is such that the portion B is fixedly provided and integrated into the main body of the integral type second lever constituting member A constituted by a light and highly rigid material such as aluminum.

Appropriate means such as caulking and screw-fastening can be used to attach the deforming portion forming member B to the integral type second lever constituting member A. In the drawings, the same members as the above-described Embodiment 1 are all denoted by the same reference numerals. The same figure (D) shows the state of removal of the connecting portion 10 in the deforming portion forming member B; whether a set of connecting portion 10 is removed at once as shown in the drawing or whether it is divided into several portions and removed one after another may be arbitrarily determined depending on the setting of the assembly process. A thin portion 8b is the portion of the fulcrum portion 8 which actually operates as the fulcrum.

Embodiment 3

Figure 4:
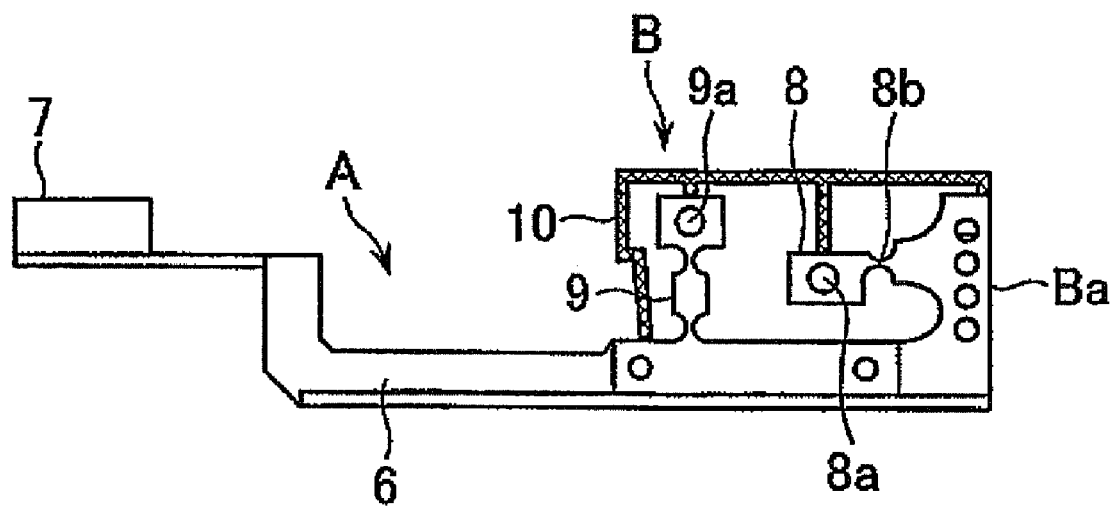
FIG. 4 is a side view of an integral type second lever constituting member showing a third embodiment.

In a third embodiment shown in FIG. 4, the fulcrum 8b of the fulcrum portion 8 is constituted so as to be connected to a rising portion Ba of the deforming portion forming member B, positioned at the rear end of the integral type second lever constituting member. This embodiment has the portion operating as the fulcrum of the fulcrum portion 8 and the portion operating as the force point of the force point portion 9 being at the same height, and has an advantage in that an electromagnetic balancing-type balance having a good balance of the center of gravity can be provided.

Embodiment 4

Figure 5:
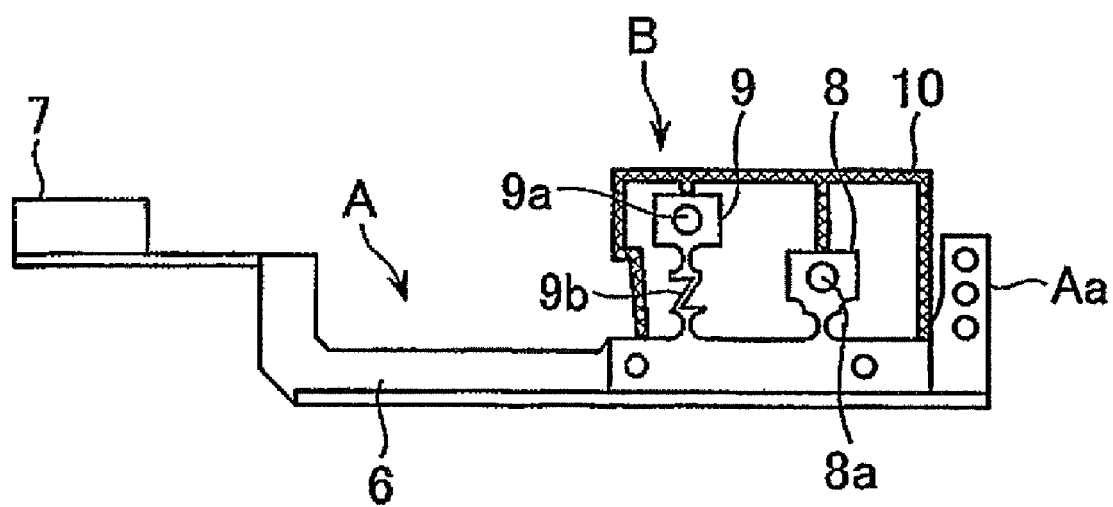
FIG. 5 is a side view of an integral type second lever constituting member showing a fourth embodiment.

FIG. 5 shows a fourth embodiment. In this embodiment, the portion of the force point portion 9 which connects between the force point attachment portion having the screw-fastened-hole 9a and the lever portion 6 of the integral type second lever constituting member A is formed as a shock absorbing portion 9b. Specifically, in the constitution shown in the drawing, this shock absorbing portion 9b is formed in the shape of waves such that the shape of the side thereof is of substantially Z-shape. By this constitution, when large shock is applied to the attachment portion of the force point portion 9 through the first lever member by dropping a weighed object on the weighing pan, for example, the shock absorbing portion 9b in the shape of waves can absorb the shock by deforming so as to stretch its shape of waves, and prevent generation of damage in the load measuring mechanism side.

Although the above-described shock absorbing portion can be directly formed on the integral type second lever constituting member A without a deforming portion forming member as shown in FIG. 1, if it is formed on the deforming portion forming member B as in the constitution shown in the drawing, more effective shock absorption is enabled since the deforming portion forming member B itself is constituted by a spring material. Although the rising portion positioned at the rear end of the integral type second lever constituting member A is constituted as a portion Aa of the main body of the integral type second lever constituting member A in the constitution shown in the drawing, of course it may also be a rising portion Ba formed in the deforming portion forming member B side, in the same way as Embodiment 3 shown in FIG. 4.

Embodiment 5

Figure 6:
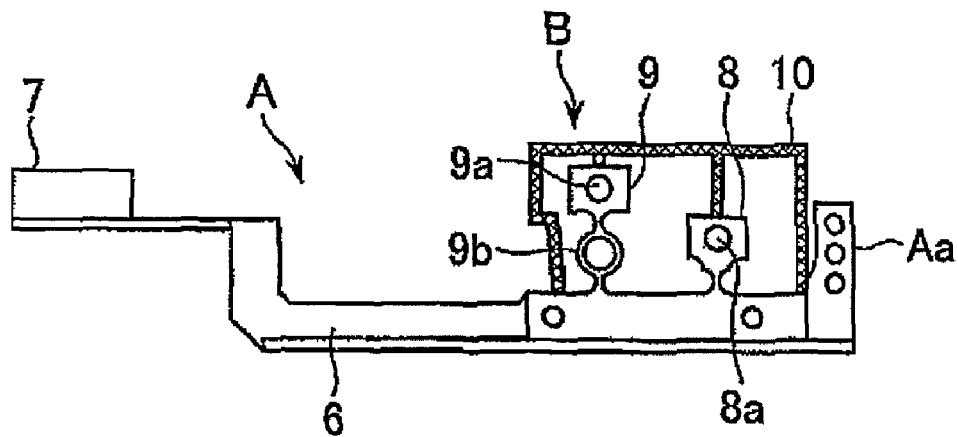
FIG. 6 is a side view of an integral type second lever constituting member showing a fifth embodiment.
Figure 7:
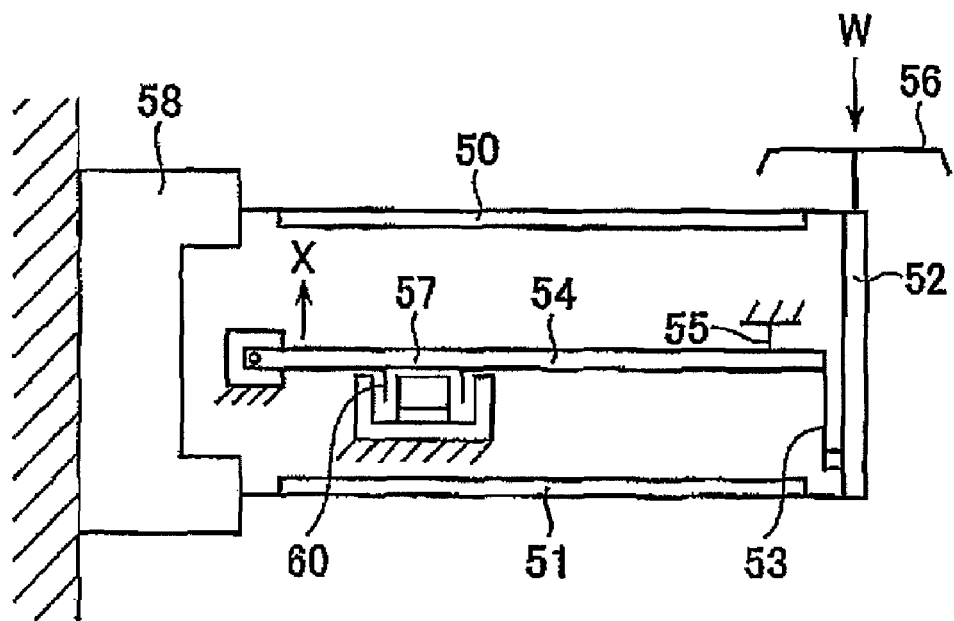
FIG. 7 is a schematic view showing the schematic constitution of an electronic balance.

FIG. 6 shows a fifth embodiment. This embodiment is a variation of the above-described fourth embodiment and is characterized in that the structure of the shock absorbing portion 9b of the force point portion 9 is formed in an annular shape, as compared with the shape of waves described above.

In the constitution of the shock absorbing portion 9b in this shape, shock is dispersed over the whole annular portion so that it deforms when larger shock is generated as compared with the preceding embodiment; it is a constitution preferably used for an electronic balance which weighs especially large weights.

INDUSTRIAL APPLICABILITY

While the present invention has been described as an integral type second lever constituting member which is a member to be attached to the load measuring mechanism of an electronic balance, the method of attaching (screw-fastening) a predetermined member to a predetermined attachment subject and thereafter removing a connecting portion which has integrated the attachment portion can be widely applied to other technical fields, mainly of precision machinery components.

In addition, while an integral type lever member having a force point portion and a fulcrum portion has been described using an example of an integral type second lever constituting member having a second lever member connected to a first lever member arranged in a Roberval's mechanism in the above embodiments, of course it is also possible to eliminate the first lever member and make a constitution with the integral type lever member being the only lever member.

The invention claimed is:

1. A load measuring mechanism of an electronic balance constituted so as to transmit a load of a weighed object to an electromagnetic portion using a lever which operates by being guided by a Roberval's mechanism, the load measuring mechanism comprising:
   a Roberval's mechanism;
   a first lever member incorporated into the Roberval's mechanism;
   an integrated second lever member connected to the Roberval's mechanism and the first lever member via a removable connection part, the integrated second lever member being formed in the shape of a flat plate using a single thin plate, wherein a fulcrum portion and a force point portion are arranged so that they are positioned on an identical plane.

2. The load measuring mechanism of an electronic balance according to claim 1, wherein the fulcrum portion and force point portion of the integrated second lever member are constituted as a deforming portion forming member, and the deforming portion forming member is fixedly provided on a lever portion of the integrated second lever member.

3. The load measuring mechanism of an electronic balance according to claim 1 or 2, wherein a portion connecting between an attachment of the force point portion and the lever portion in the integrated second lever member is formed as a shock absorbing portion which is deformed by instantaneous shock to absorb the shock.

4. The load measuring mechanism of an electronic balance according to claim 1 or 2, wherein the force point portion in the integrated second lever member is attached to the first lever member so that the whole mechanism results in a double lever structure.

5. A load measuring mechanism of an electronic balance constituted so as to transmit a load of a weighed object to an electromagnetic portion using a lever which operates by being guided by a Roberval's mechanism, the load measuring mechanism comprising:
   a first lever member incorporated into a Roberval's mechanism consisting of a stationary block, a floating frame, an upper sub-lever and a lower sub-lever; and
   an integrated second lever member attached to a constitution to which the first lever member is incorporated,
   wherein attachment of the integrated second lever member is such that a force point and a fulcrum portion thereof are attached to the Roberval's mechanism side through screw-fastened holes.

6. A method for assembling a load measuring mechanism of an electronic balance which transmits a load of a weighed object to an electromagnetic portion using a lever which operates by being guided by a Roberval's mechanism, wherein a lever portion is constituted as an integrated form such that a lever main body and a fulcrum portion and a force point portion connecting to this lever main body are positioned on a same plane, the fulcrum portion and force point portion are connected to an integrated lever constituting member main body side by a connecting portion, the fulcrum portion and force point portion of this integrated lever member are screw-fastened to the Roberval's mechanism side, and the connecting portion is removed after completion of screw-fastening.

7. A method for assembling a load measuring mechanism of an electronic balance which transmits a load of a weighed object to an electromagnetic portion using a lever which operates by being guided by a Roberval's mechanism, the method comprising the steps of:
   incorporating a first lever member to a Roberval's mechanism formed of a stationary block, a floating frame, an upper sub-lever and a lower sub-lever;
   attaching by screw-fastening an integrated second lever member to a constitution to which the first lever member is incorporated, turning torque of a screw by the screw-fastening being supported by a connecting portion; and
   removing the connecting portion after attachment of the second lever member has been completed.

* * * * *